(12) United States Patent
Haner

(10) Patent No.: US 7,459,824 B2
(45) Date of Patent: Dec. 2, 2008

(54) HIGH TORQUE REPULSION MOTOR

(76) Inventor: Lambert Haner, 22555 Center Ridge Rd., Suite 501, Rocky River, OH (US) 44116

( * ) Notice: Subject to any disclaimer, the term of this patent is extended or adjusted under 35 U.S.C. 154(b) by 182 days.

(21) Appl. No.: 10/977,746

(22) Filed: Oct. 29, 2004

(65) Prior Publication Data

US 2006/0091756 A1    May 4, 2006

(51) Int. Cl.
*H02K 29/10* (2006.01)
*H02P 25/10* (2006.01)

(52) U.S. Cl. .................. 310/179; 310/180; 318/725; 388/811

(58) Field of Classification Search ............ 310/184, 310/179, 180; 388/811; 318/725, 726
See application file for complete search history.

(56) References Cited

U.S. PATENT DOCUMENTS

| | | | | |
|---|---|---|---|---|
| 1,624,378 A * | 4/1927 | Weber | | 318/725 |
| 4,166,991 A | 9/1979 | Haner | | 318/725 |
| 4,227,134 A | 10/1980 | Haner | | 318/725 |
| 4,358,724 A | 11/1982 | Haner | | 388/811 |
| 4,879,501 A | 11/1989 | Haner | | 388/811 |
| 5,002,063 A | 3/1991 | Haner | | 310/166 |
| 5,205,801 A | 4/1993 | Haner | | 428/63 |
| 5,336,956 A | 8/1994 | Haner | | 310/179 |
| 5,424,625 A | 6/1995 | Haner | | 318/725 |
| 5,474,090 A | 12/1995 | Begun et al. | | 128/787 |
| 5,491,398 A | 2/1996 | Haner | | 318/725 |
| 5,686,805 A | 11/1997 | Haner | | 318/725 |
| 5,747,910 A | 5/1998 | Haner | | 310/180 |
| 5,787,915 A | 8/1998 | Byers et al. | | 137/1 |
| 5,936,374 A | 8/1999 | Haner | | 318/725 |
| 6,049,187 A | 4/2000 | Haner | | 318/725 |
| 6,108,488 A | 8/2000 | Haner | | 388/811 |
| 6,321,032 B1 * | 11/2001 | Jones et al. | | 388/811 |
| 6,639,338 B1 | 10/2003 | Haner | | 310/166 |
| 7,166,984 B1 * | 1/2007 | Jones et al. | | 318/725 |
| 2006/0091756 A1 * | 5/2006 | Haner | | 310/180 |

OTHER PUBLICATIONS

"The Dynamotor Electronic Brushless Repulsion Motor", Nov. 5, 2003 Robert Klimo, SMMA 2003 Fall Technical Conference.*

* cited by examiner

*Primary Examiner*—Karl I Tama
(74) *Attorney, Agent, or Firm*—Pearne & Gordon LLP

(57) ABSTRACT

A high torque AC motor of the repulsion type that includes at least four stator poles and an armature with chordally oriented windings. The armature windings are cyclically shorted and opened in groups at appropriate angular positions of the armature by a non-contact switch circuit carried on the armature.

1 Claim, 4 Drawing Sheets

HIGH TORQUE REPULSION MOTOR

BACKGROUND OF THE INVENTION

The invention relates to electric motors and, in particular, to a type of repulsion motor with a high torque capacity.

PRIOR ART

U.S. Pat. No. 5,424,625 discloses a repulsion motor characterized by the absence of electrical brushes. The repulsion motor has desirable performance characteristics which include high starting torque and speed controllability by a variety of relatively simple, inexpensive and RFI free techniques.

Numerous industrial, consumer and specialized applications for electric motors exist where the need for relatively high torque has heretofore not been satisfied. Hand-held tools, particularly for industrial use are examples of devices where an increase in motor torque for a given motor physical size is highly desirable. Other examples of where high torque, low speed electric motors can be particularly desirable are those where a mechanical transmission can be eliminated and the motor can be directly coupled to the load. Traction drives for vehicles and other devices can typically benefit from use of high torque, low speed electric motors.

SUMMARY OF THE INVENTION

The invention provides an AC electric motor with exceptional torque capacity in the form of an improved repulsion motor. The motor of the invention has an increased number of stator poles which, it has been surprisingly found, produce an exponential increase in torque when compared to motors of similar size.

By departing from the long-traditional use of a single pair of stator poles and using, instead, four stator poles, it has been discovered that, remarkably, a four-fold increase in motor torque can be theoretically produced in essentially the same motor size. It has been demonstrated that even with practical limits on motor geometry, at least a three-fold increase in torque can be achieved by doubling the number of poles from two to four. Where the stator poles are increased in number beyond four, still larger torque capacities can be obtained.

DESCRIPTION OF THE PREFERRED EMBODIMENTS

Figure 1:
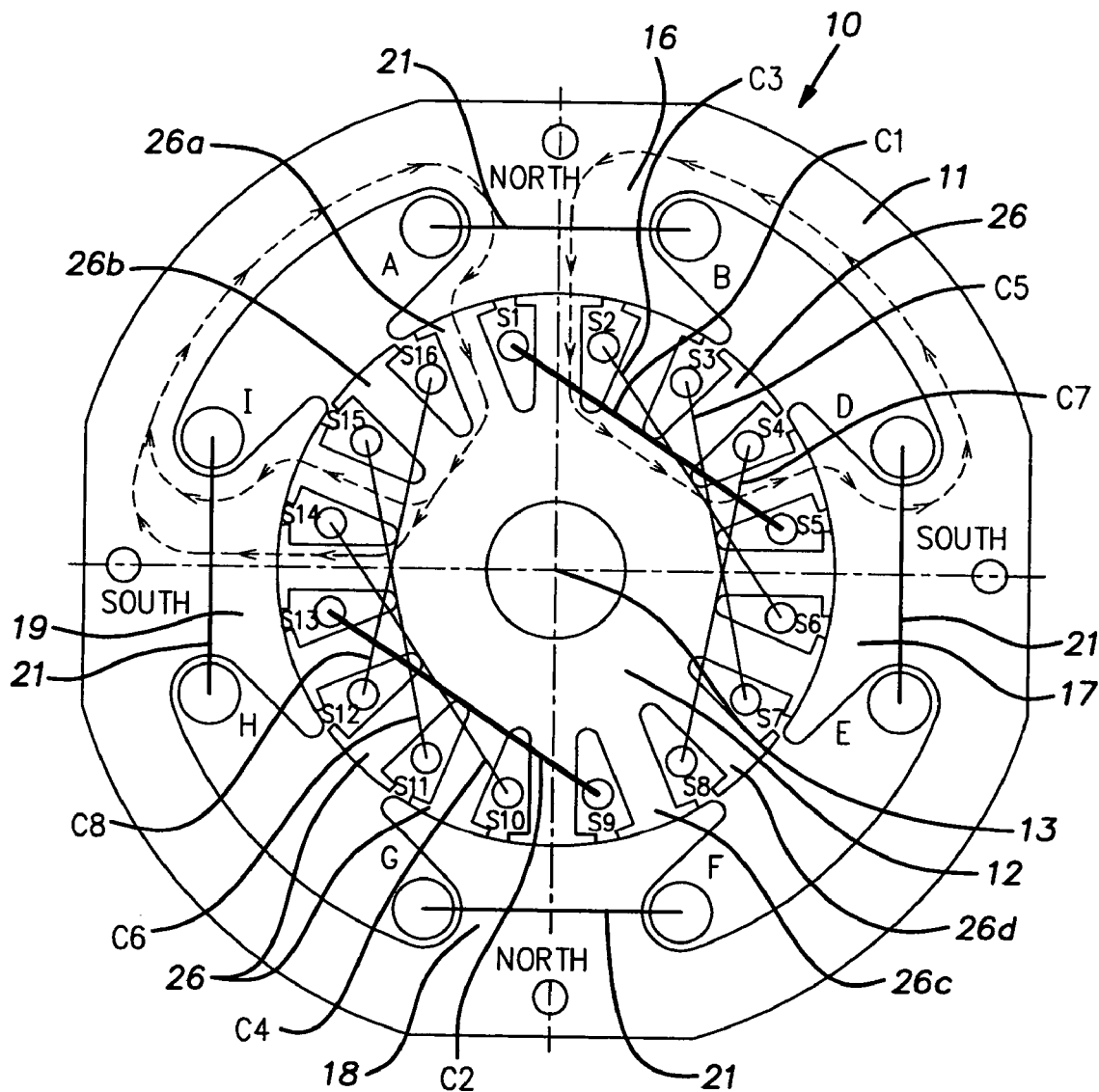
FIG. 1 is a schematic axial view of a four-pole motor constructed in accordance with the invention.

An example of a motor 10 embodying the invention includes a stator 11 and an armature or rotor 12 mounted by suitable bearing structure for rotation in the stator about a rotational axis 13 generally at the geometric center of the armature. The stator 11 and armature 12 are constructed of ferromagnetic material, typically from laminations of sheet steel stacked axially parallel to the plane of the drawing, as is customary, with both the stator and armature 11, 12, having the same axial length (stack height).

The illustrated stator 11 includes four poles 16-19. The poles 16-19 are each energized by an associated field coil 21. The field coils 21, typically each of multiple turns of insulated or magnet wire, are connected in parallel or in series to an AC power source, and wired so that the magnetic polarity of adjacent poles is opposite (as arbitrarily indicated by North and South). The armature 12 has a plurality of generally radial slots S1-S16 on its periphery, preferably, of a number that is a multiple of the number of stator poles 16-19 and, preferably, at least three slots per pole and, therefore, at least three intervening teeth 26. In the illustrated example, four slots S and four teeth 26 per pole are used.

Separate coils C, typically of multiple turns of insulated or magnet wire, are wound or otherwise positioned in the armature slots S. Each armature coil C is located in two spaced slots S (one side of a coil in one respective slot) such that in its theoretical plane it subtends the chordal distance between the centers of two adjacent poles, e.g. between poles 16, 17. It follows, since in the illustrated case, there are four armature teeth 26 for each stator pole 16-19, each armature coil C surrounds four teeth 26.

Figure 2:
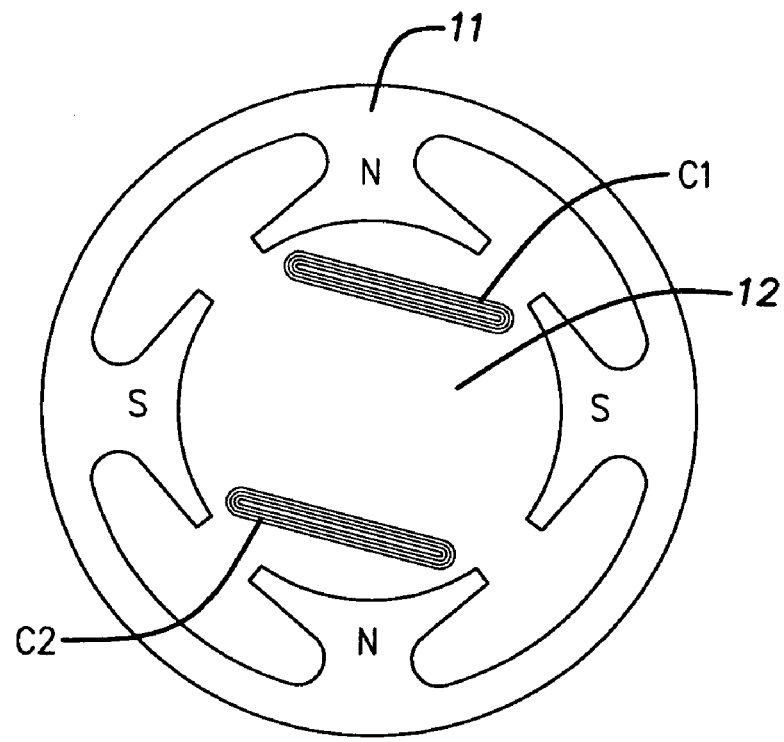
FIG. 2 is a simplified schematic illustration of the motor of FIG. 1 with armature coils that span alternate chords between the stator poles.
Figure 3:
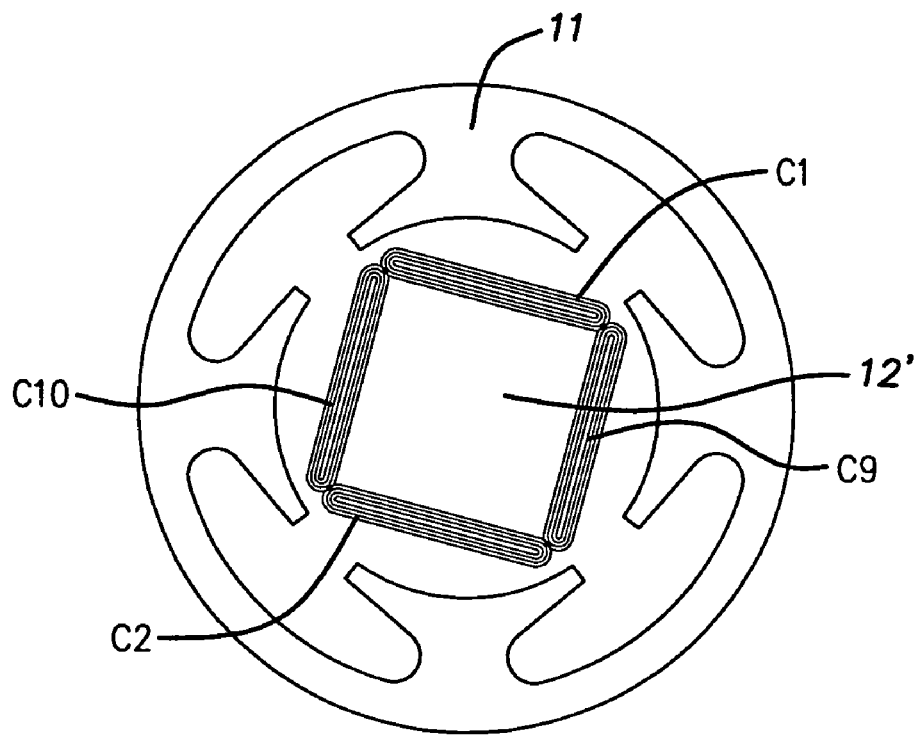
FIG. 3 is a simplified schematic illustration, similar to FIG. 2, of a modified form of the motor with armature coils that span all of the chords between the stator poles.
Figure 5:
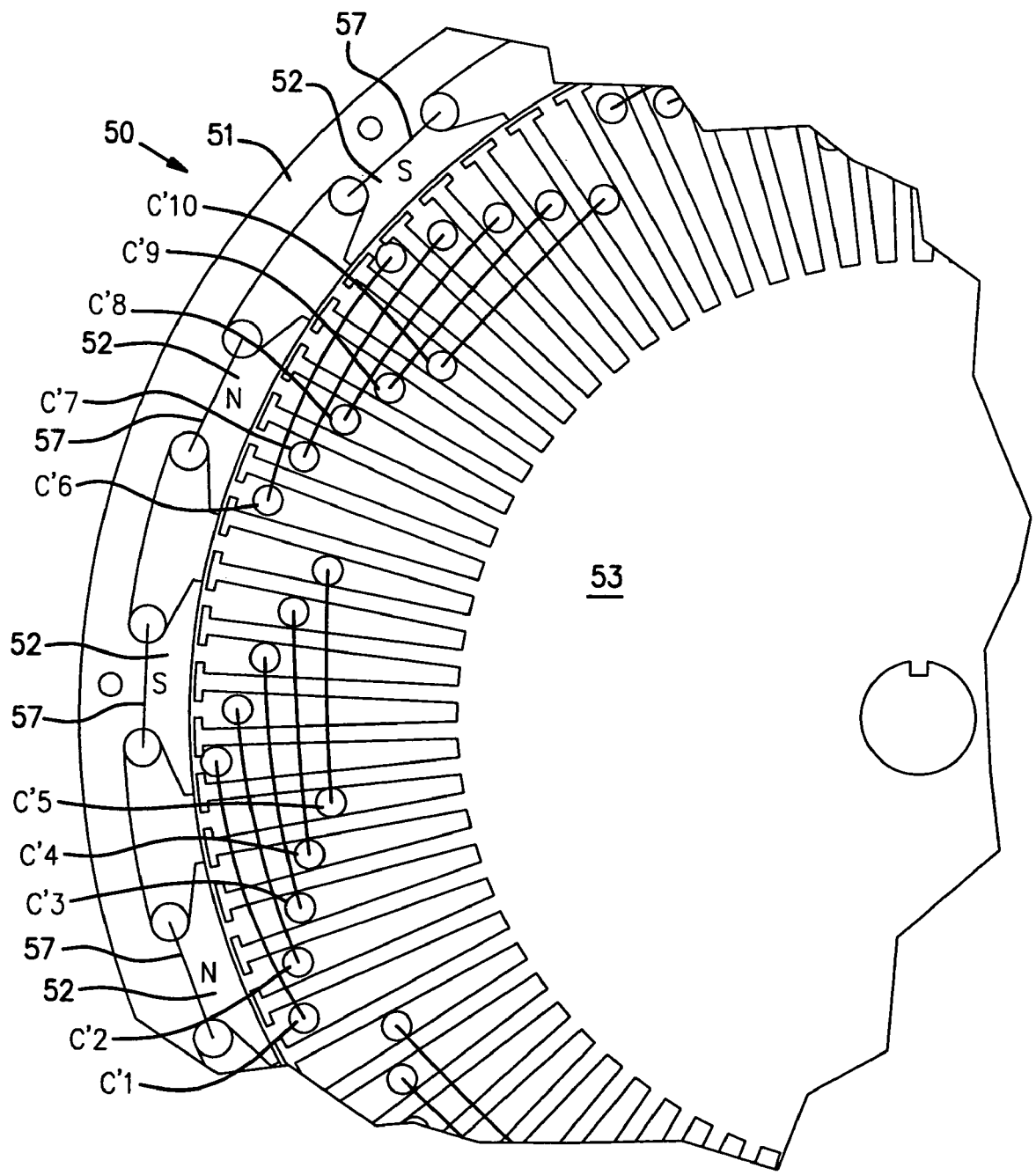
FIG. 5 is a fragmentary axial view of a large diameter repulsion motor constructed in accordance with the invention.

Inspection of FIGS. 1 and 2, and later discussed FIGS. 3 and 5, illustrates that the planes of the coils C have a generally chordal orientation. This term "chordal" as broadly used herein, describes an armature coil that is truly chordal in orientation, or is effectively chordal by surrounding a predetermined set of armature teeth (e.g. four teeth in the illustrated case of FIG. 1). It will thus be appreciated that the turns of a chordal armature coil C may be located at different radii in one or both of its spaced slots S and may have its end turns deviating widely from a geometric chordal plane.

FIGS. 1 and 2 are intended to depict the same armature winding arrangement. In FIG. 1, the coils C1 and C2 are emphasized by thicker line widths for explanation purposes but it will be understood that all of the armature coils C1-C8 are essentially the same. In FIG. 2, for clarity, only two separate coils C1 and C2 are illustrated. Chordal armature coils C exist in all of the armature slots S with each coil C surrounding four teeth and trailing or preceding (clockwise or counter-clockwise) adjacent coils C by one tooth, i.e. by the arcuate space between adjacent slots S. Thus, for the illustrated motor 10, with four stator poles 16-19 and four slots S per pole, there are eight separate chordally disposed armature coils C distributed evenly in the slots S about the outer peripheral regions of the armature 12. Stated otherwise, there is a total of 16 slots and each coil C resides in two slots S spaced chordally by four teeth 26.

Each armature coil C when shorted and in a certain range of angular position, interacts with the magnetic field produced between a pair of adjacent stator poles 16-19 to produce a torque between the stator 11 and armature.

With reference to the upper half of FIG. 1, the magnetic flux is schematically indicated by the broken lines and arrowheads; the same condition exists in the lower half of the motor 10 but, for clarity, is not shown. The flux in each pole 16-19 splits in half. A shorted coil C2 prevents direct passage of magnetic flux through its plane from one north pole to an adjacent south pole. The magnetic flux from pole tip A can pass to pole tip I but not through the shorted coil C2. Flux from B can pass to D but not to E through the shorted coil C1.

The flux from B to D passes through the coil C1, but in both directions so the net flux is zero.

The following discussion, referencing FIG. 1, assumes that the armature 12 rotates clockwise. When the armature coil C1 is shorted, flux from the area of the pole tip A is prevented from passing through this coil and, more specifically, through the armature teeth 26 it surrounds. Consequently, the flux from this pole tip area A is concentrated to enable it to flow through the tooth 26a following or trailing the coil C1 so that the flux density in the pole is increased.

Flux density is extremely high (flux/unit area) because all of the flux is constrained to flow through the path of least resistance, i.e. the iron (ferromagnetic material) and the only path available is the tooth 26a trailing the coil C1 and having approached the pole extremity A since the preceding tooth is within this shorted coil C1. Flux cannot pass into the preceding tooth as well as the other teeth within the shorted coil C1 because the shorted coil produces a magnetomotive force that opposes the magnetomotive force of the stator pole 16.

The pole 16 is excited by an AC source and, therefore, the amplitude of the magnetic flux must remain constant to achieve the concentration of flux in the pole, the pole coil circuit automatically increases current in it. Therefore, the field energy—which is proportional to ampere turns times the flux—increases because the amperes are increasing. Torque is proportional to the change in field energy divided by a corresponding angular change in position of the armature. Considering the law of nature that a system tends to move to a lower energy level, the armature will tend to move away from the position where field energy is a maximum, which as explained, is where the trailing tooth 26a approaches the pole extremity A.

As explained, the maximum torque produced by shorting of the coil C1 occurs where the tooth 26a trailing the coil is just approaching the extremity of the pole tip A; this is the location that is now occupied by the tooth 26b. This is a condition where the flux density in the pole 16 is highest and, therefore, where the field energy is greatest. A high torque condition results because torque is proportional to the change in energy through angular displacement. The same torque analysis applies to the coil C2 and the trailing tooth 26c at the pole 18 of the same polarity.

Figure 4:
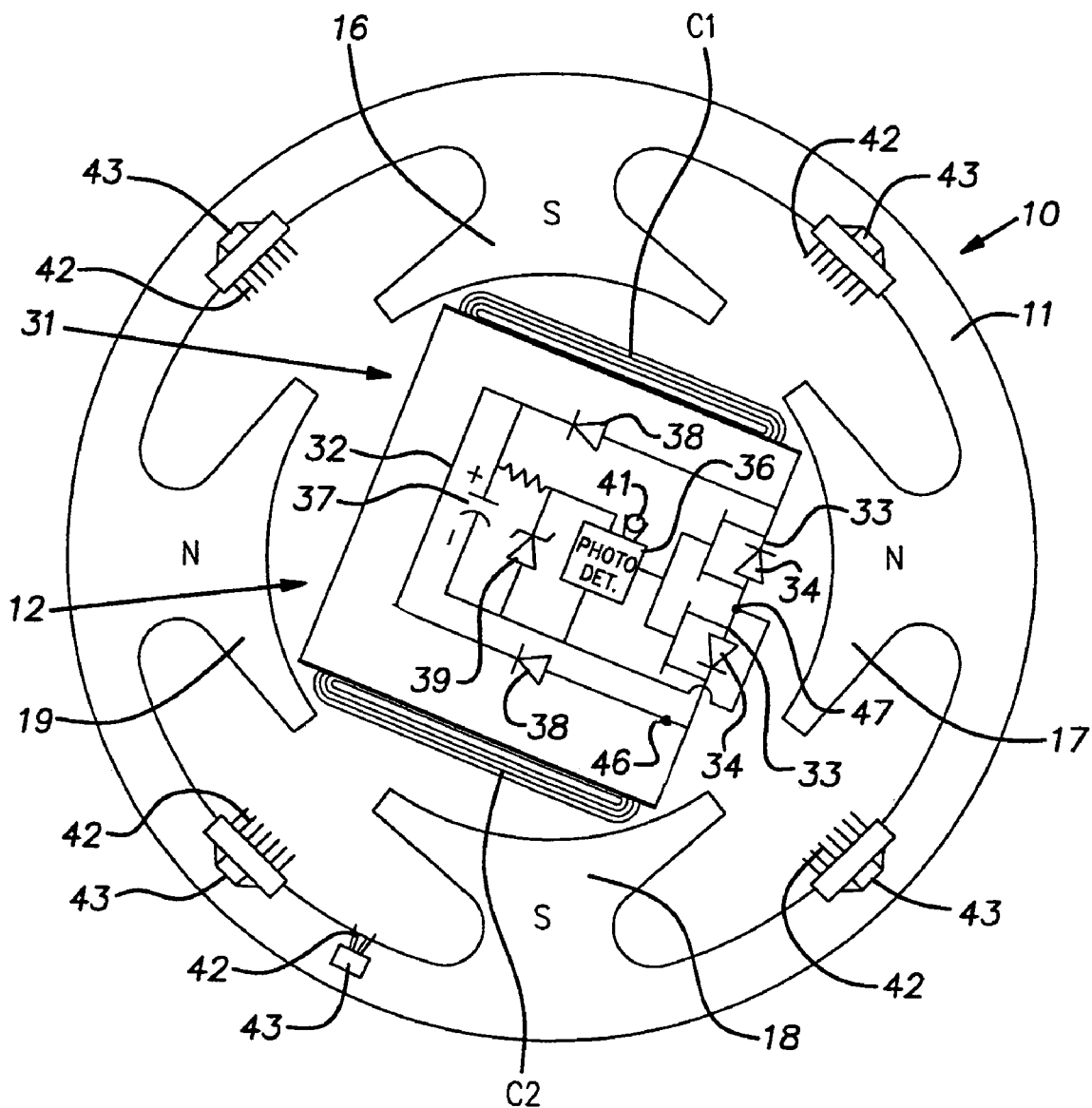
FIG. 4 is a schematic electrical circuit representing one group of the coils on the armature and an electrical switch circuit for alternately shorting and opening the coils of the group as a function of the angular position of the armature.

FIG. 4 schematically illustrates a switch circuit 31, carried on the armature 12 for shorting coils C1, C2 on the armature when the coils are in an angular position relative to a pole 16-19 to develop torque and to open the coils when they are in other positions. The armature coils C1, C2 are connected in series at one side by a line 33 and at the other side by a line 46 within the circuit 31. Alternatively, the coils C1, C2 can be connected in parallel with the circuit 31. The circuit 31 includes a pair of transistors 33 connected back-to-back so as to switch AC current in the coils C1, C2. The transistors 33 include integral diodes 34. The transistors 33 are turned on or off by a photodetector 36, a form of non-contact signal detector or sensor, supplying current to the transistor gates. Current is supplied to the photodetector 36 from a capacitor 37 charged by currents induced in the coils C1, C2 by transformer action with the stator and passing through diodes 38. A zener diode 39 protects the circuit 31 from excessive voltage. The circuit 31 is fixed on the armature in a convenient location and rotates with it. A lens 41 of the photodetector 36 is arranged to respond to the light beams 42 emitted from a set of four LED's 43 fixed on the stator 11 at four equally spaced locations symmetrically arranged about the axis of the armature. The relative angular positions of the photodetector lens 41 and light beams 42 of the LEDs is set to activate the photodetector 36 and, therefore, the transistors 33 when the armature 12 is in a location where the teeth 26a, 26c immediately trailing the coils C1, C2 are in close proximity to the extremity of the pole tips A and F; D and H. The width of the LED light beam 42 and viewing angle or window of the photodetector lens 41 is arranged to maintain the photodetector 36 in a conducting mode until the second armature tooth 26b, 26d moves into close proximity to the pole extremity A, F; D, H at which time the light beam 42 no longer adequately illuminates the photodetector 36 to maintain its conducting state, the transistors 33 turn off and the coils C1, 2 again open.

To develop and maintain rotation of the armature, successive armature coils are shorted, while previously shorted armature coils are opened. When the angular position of successive teeth 26b, 26d for example, approach the pole tips A and F, coils C8 and C7 are shorted and coils C1 and C2 are opened. This is accomplished by providing multiple switch circuits like the circuit 31 of FIG. 4 for these additional armature coils. The armature coils C are arranged electrically in separate groups, connected either in parallel or in series, to reduce the number of required switch circuits. The members of each coil group are those displaced from one another by the arcuate distance between stator poles. In the case of the motor 10 of FIGS. 1 and 2, the coils C1 and C2 in slots S1, S5, and S9, S13, respectively constitute a group. Three other coil groups are: C3, C4; C5, C6 and C7, C8, respectively. The coil groups are shorted in the sequence listed four times per revolution of the armature.

The photodetector 36 of each circuit 31 for each coil group, as described above in connection with the coils C1, C2, is located on the armature relative to the light beams 42, of the LEDs 43 so that the relevant circuit 31 shorts the armature coils C of its group when the adjacent teeth immediately trailing these coils move into close proximity to the pole extremities A and F; D and H. All of the separate switch circuits 31 can be commonly electrically connected at points 46, 47 (FIG. 4) to assure adequate electrical power is derived for the circuits regardless of the angular starting position of the armature 12.

FIG. 3 illustrates separate armature coils subtending each of the chords between each of the stator poles. There may be instances where it is desired to construct a motor with this arrangement. It can be demonstrated, however, that intervening armature coils C9 and C10 have essentially no effect on the action of the alternate coils which are the equivalent of the coils, for example, C1 and C2 of FIGS. 1 and 2.

Referring to FIG. 5, there is shown a fragmentary arcuate segment of an example of a large diameter high-torque repulsion motor 50 constructed in accordance with the invention. The motor 50 has a stator 51 with a total of sixteen (16) poles 52 and an armature 53 with eighty (80) teeth 54 and eighty (80) slots 56. Thus, in this example, there are five teeth and five slots for each stator pole. Each stator pole 51 has a winding or coil 57, all of the coils being electrically connected in series, or parallel, or a combination of series and parallel and supplied with AC power. The coils 57 are wired to produce alternate magnetic polarities at adjacent poles 52.

Armature coils C' are each placed in a generally chordal arrangement, subtending the distance between adjacent stator poles 51 so that they each have sides in slots 56 spaced five slots from one another and surround five stator teeth 54. As before with the motor 10, the stator and armature coils 57, C' are visually simplified for clarity but, typically, will each comprise numerous turns of insulated or magnet wire.

The armature coils C', as discussed in connection with the motor of FIG. 1, are electrically connected in groups. The coils C' in each armature coil group are those spaced from one another by the arcuate or chordal distance between two stator poles 52. For example, coil C'1 is connected to coil C'6 and to the remaining six coils (a total of 8 coils in one group) around the armature having the same spacing from one another as these coils C'1 and C'6. Similarly, coil C'2 and C'7 are grouped together with six other coils around the armature and so forth such that there are a total of 5 groups (5 groups×8 coils/group×2 slots/coil=80 slots).

A switch circuit 31 such as illustrated in FIG. 4 is provided for each of the five groups (a total of 5 circuits 31) are mounted on the armature 53. The circuits 31 operate to short the coils C' at appropriate angular positions in the same manner as described above in connection with the motor 10. Light sources or beams fixed or referenced to the stator 51 are arranged in the paths of the photodetector lenses 41 to turn each photodetector 36 of each of the five switch circuits 31 on and off sixteen times per revolution of the armature 53. Specifically, a light beam 42 and a photodetector 36 of each switch circuit are set to turn the photodetector on to short its respective coils C'when the armature teeth 54 trailing the respective coils C'are each at the extremity of a pole 52 (e.g. a north pole) and to turn the detectors off to open their respective coils when the next teeth approach the extremities of such poles.

In the foregoing discussions of the motors 10 and 50 of FIGS. 1 and 5, armature coils were described as being shorted when the teeth immediately trailing them approached the extremity of adjacent stator poles and being opened when the next trailing teeth approached these pole extremities. The precise timing of the shorting and/or opening of these coils by the circuit 31 or its equivalent can be varied, either advanced or retarded, to accomplish some desired result such as controlling torque, improving efficiency, and the like.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. For example, other switch circuits are contemplated as a substitute for the circuit 31. Non-contact signal devices that can be substituted for the photodetector 36 include Hall effect devices, other sensors responsive to electromagnetic radiation, magnetic fields, or sound waves, for example. Accordingly, the patent is not to be limited in scope and effect to the specific embodiments herein shown and described nor in any other way that is inconsistent with the extent to which the progress in the art has been advanced by the invention.

What is claimed is:

1. A repulsion motor having a stator and an armature supported to rotate about an axis within the stator, the stator having an even number of poles, greater than two, spaced circumferentially about the axis of rotation, each pole having an associated winding, the windings being arranged such that adjacent poles have opposite polarity, the armature having a circular periphery with a plurality of open slots, the armature having a plurality of coils in the slots distributed about its axis of rotation, the coils each being arranged in a generally chordal plane subtending an angle substantially equal to the angle between the centers of adjacent stator poles, the coils being arranged in groups, the coils of each group being distributed about the circumference of the armature and spaced from one another an angular distance equal to or twice the angular distance between adjacent stator poles, the coils of each group being electrically interconnected to one another and being electrically isolated from the other groups of coils, and switches including non-contact sensors mounted on the armature for shorting and opening the armature coils of respective groups in response to the angular position of the armature relative to the stator whereby an alternating current applied to the stator windings develops torque on the armature where armature coils are selectively shorted by said switches so as to create a magnetomotive force that reacts against the adjacent stator field.

* * * * *